July 15, 1958 L. W. STAMMERJOHN 2,843,813

MAGNETIC AMPLIFIERS

Filed Dec. 28, 1953 3 Sheets-Sheet 1

INVENTOR
L. W. STAMMERJOHN
BY
N. S. Ewing
ATTORNEY

July 15, 1958 L. W. STAMMERJOHN 2,843,813

MAGNETIC AMPLIFIERS

Filed Dec. 28. 1953 3 Sheets-Sheet 2

INVENTOR
L. W. STAMMERJOHN
BY N. S. Ewing
ATTORNEY

July 15, 1958 L. W. STAMMERJOHN 2,843,813

MAGNETIC AMPLIFIERS

Filed Dec. 28. 1953 3 Sheets-Sheet 3

INVENTOR
L. W. STAMMERJOHN
BY
N. D. Ewing
ATTORNEY

United States Patent Office 2,843,813

Patented July 15, 1958

2,843,813

MAGNETIC AMPLIFIERS

Lambert W. Stammerjohn, Whippany, N. J., assignor to Bell Telephone Laboratories, Incorporated, New York, N. Y., a corporation of New York Application December 28, 1953, Serial No. 400,409

6 Claims. (Cl. 318—207)

This invention relates generally to magnetic amplifiers and more particularly, although not exclusively, to magnetic amplifiers suitable for use in servo control systems.

A principal object of the invention is to increase the output power and gain of a magnetic amplifier without causing instability.

Another object is to improve the output voltage wave form of a magnetic amplifier.

A further object is to improve the performance of motors driven by magnetic amplifiers in servo control systems.

Still another object is to decrease the criticalness of the electrical circuit constants of a magnetic amplifier.

In the past a common method of increasing the gain and the output voltage of a magnetic amplifier has been the connection of a capacitor across the output windings of the amplifier. The impedances of the reactor windings of the magnetic amplifier are inductive and the capacitor tunes the circuit to partial resonance, thereby increasing the voltage appearing across the amplifiers output windings and the load. Such a capacitor is, however, limited to a maximum value above which the magnetic amplifier would be unstable due to the presence of low frequency oscillations caused by a ferroresonant condition of the magnetic amplifier reactors and the terminating capacitor. This maximum value is below the optimum value from the standpoint of gain, with the result that the increase in gain and output voltage that can be achieved by this means is limited.

Another disadvantage involved in the use of a single capacitor connected across the output windings of a magnetic amplifier to increase gain is encountered when the amplifier is used to control a two-phase induction motor in a servo control system. Such a motor will run single phase when power is supplied to only one winding if the other is terminated in a suitable capacitive reactance. If the control winding is so terminated by the magnetic amplifier and capacitor, the magnetic amplifier cannot effectively control the speed and direction of rotation of the motor. In particular, it becomes impossible to stop rotation of the motor by removing the signal from the magnetic amplifier. This loss of control is difficult to avoid if a single capacitor is used across the output of the magnetic amplifier to increase gain, for the reason that the value of capacitance needed to achieve the desired gain usually satisfies the criterion for single-phase motor operation.

In a principal aspect, the present invention takes the form of a magnetic amplifier with a four-terminal $\pi$ network comprising a pair of shunt capacitors and an interposed series inductor connected in series between its output windings and the load. The capacitor nearest the output windings is kept small enough to avoid any danger of amplifier instability due to the presence of low frequency oscillations, while a partial resonance between the inductor and the second capacitor produces a large voltage across the second capacitor. As a result, the output power and gain of the magnetic amplifier is considerably increased without increasing the danger of instability in any way.

Magnetic amplifiers embodying the present invention are particularly well suited for use in controlling two-phase induction motors in servo control systems. The $\pi$ network is connected in series between the output windings of the amplifier and the winding of the control phase of the motor. The impedance presented to the motor winding by the network is sufficiently low to place the motor in a stable two-phase operating range at all times even though this impedance is capacitive. The present invention thereby makes it possible to increase the gain of the magnetic amplifier to the optimum degree without introducing any danger of single-phase operation of the two-phase motor.

A more thorough understanding of the present invention and the manner in which it permits the accomplishment of these and other objects of the invention may be obtained from the following detailed discussion of magnetic amplifiers in general and a specific embodiment of the invention in particular. In the drawings.

Since a certain amount of knowledge of magnetic amplifiers is helpful in arriving at an understanding of the present invention, a general discussion of magnetic amplifier operation is presented herewith by way of introduction.

Figure 1:
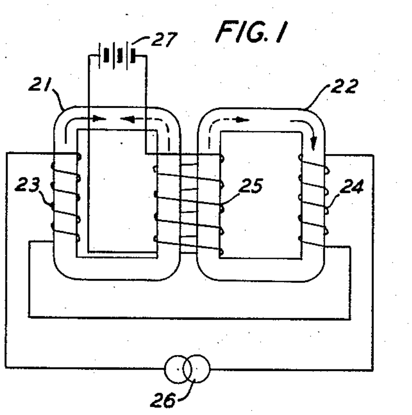
Figs. 1 through 6 show a saturable reactor and various curves useful in explaining the general nature of magnetic amplifier operation.

In Fig. 1, there is illustrated a saturable reactor which includes two separate magnetic cores 21 and 22 and three different windings 23, 24, and 25. Cores 21 and 22 are placed side by side in the usual manner, making what is for many purposes a substantially three-legged device. Windings 23 and 24 are wound on the outer legs of cores 21 and 22, respectively, and winding 25 is wound about both cores on the common inner leg. Windings 23 and 24 are connected in series across a source of alternating current 26, while winding 25 is connected across a direct current source 27. For purposes of analysis, it is assumed that cores 21 and 22 and windings 23 and 24 are respectively identical.

It should be understood, of course, that the two-core reactor arrangement illustrated in Fig. 1 is not the only one to which the present invention may be applied. A true three-legged laminated structure is a typical variant of this. The two-core structure is chosen for description, however, because of the relative simplicity of its analysis.

In the saturable reactor shown in Fig. 1, windings 23 and 24 are connected to produce instantaneous alternating current flux values poled as shown by the solid arrows. It should be noted in this connection that although the two flux paths of cores 21 and 22 are independent, the net steady state flux of fundamental frequency linking the common D.-C. winding 25 is zero. When a direct current flows in winding 25, it produces flux in the respective cores poled as shown by the dashed arrows. The respective D.-C. and A.-C. flux components in core 21 are opposed to one another, while those in core 22 add.

Figure 2:
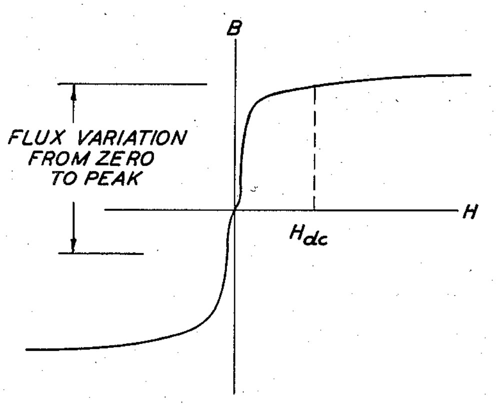

A curve showing the variation of flux density B with magnetizing force H for magnetic material of the type used in cores 21 and 22 appears in the drawings as Fig. 2. In this curve, the hysteresis of the magnetic material has been omitted since it is not pertinent to the following explanation. The D.-C. magnetizing force provided by current produced in winding 25 by D.-C. source 27 is indicated in Fig. 2 as $H_{dc}$. If the impedance of the circuit supplying winding 25 is made very large, so that the current in winding 25 depends only on this impedance and on the voltage of the D.-C. source 27, the magnetizing force $H_{dc}$ will be constant and controlled by the current in winding 27. In the presence of such a constant D.-C. magnetic force and a sinusoidal A.-C. voltage across windings 23 and 24 in series, the flux in core 21 tends to decrease and the flux in core 22 tends to increase at the moment indicated by the arrows in Fig. 1. For the flux in core 22 to increase, a very large magnetizing force H would have to be produced by the alternating current. The current, however, is common to both windings 23 and 24, and such a current is not produced by the demagnetized core 21. Hence, very little voltage is absorbed by winding 24 and almost all is absorbed by winding 23. On the alternate half cycle, the voltage is absorbed by winding 24. This gives rise to the voltage flux and current waves shown in Fig. 3.

Figure 3:
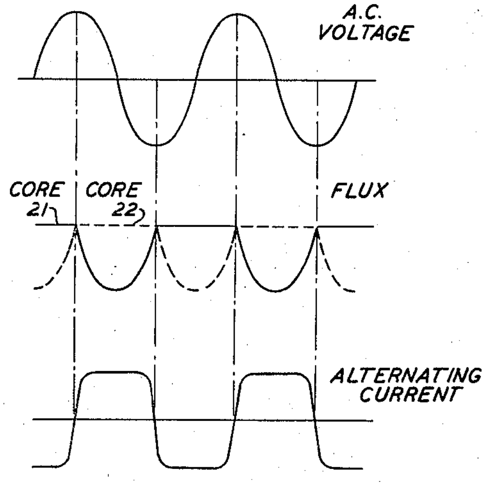

As may be seen from Figs. 2 and 3, the magnetizing force changes from $H_{dc}$ to approximately zero very abruptly and then changes to $H_{dc}$ and to $2H_{dc}$ as the alternating current goes through its cycle. This gives a very nearly square current wave. Since the change in H in either direction is equal to $H_{dc}$, the change in H permitted while the core is being demagnetized, the average value of the A.-C. magnetizing force is approximately equal to the D.-C. magnetizing force. This is the so-called "current transformer" action which gives rise to the often-quoted relationship $NI_{ac}=NI_{dc}$, where N represents the number of turns of the respective windings, $I_{ac}$ represents the current passing through the alternating current windings, and $I_{dc}$ represents the current passing through the direct current windings.

The above-described condition is often called "forced magnetization" of the cores. $H_{dc}$ is constrained to remain constant with changes of alternating current. In other words, the direct current source 27 has a very high impedance and its output is not allowed to vary. Consideration of the flux linking winding 25, however, indicates that a flux variation involving the even harmonics of the applied A.-C. voltage exists. Hence, a voltage comprising even harmonic components of the fundamental appears across winding 25.

Figure 4:
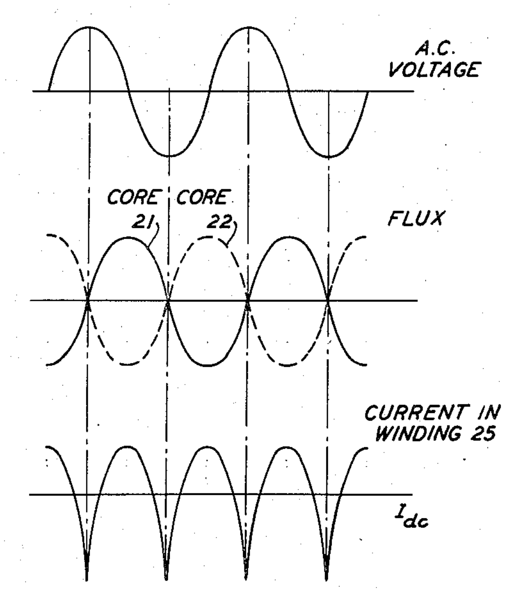

Somewhat different conditions obtain if the impedance of the D.-C. source 27 is essentially zero. Then, an even harmonic current will flow in winding 25 and no voltage will appear across it. This is often called the condition of "free magnetization." Under these conditions, the voltage, flux, and current wave shapes will be as illustrated in Fig. 4. Since the circuit connected to winding 25 is essentially a short circuit and no A.-C. voltage can appear across that winding, the A.-C. voltages are divided equally between windings 23 and 24 at all times. This means that identical sinusoidal voltages will appear across windings 23 and 24 and that the flux in cores 21 and 22 will vary sinusoidally. It also gives rise to the fact that for a given value of $NI_{dc}$ applied, the $H_{dc}$ is something less than it would be in the "forced magnetization" case. This is termed the "demagnetizing effect" of the alternating current voltage.

Figure 5:
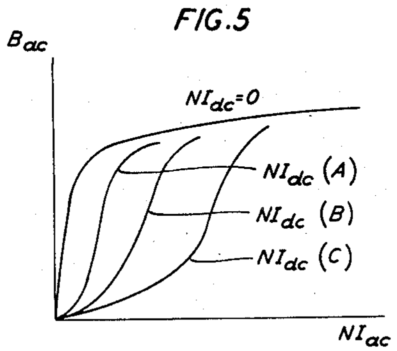
Figure 6:
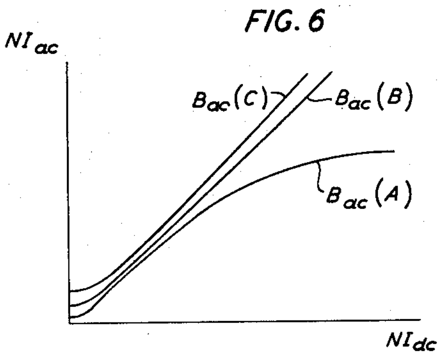

In Figs. 5 and 6, the usual characteristic curves of a saturable reactor are given in two forms. These curves display the same information in different forms and are useful for describing a steady-state operation of the saturable reactor. Fig. 5, which shows $B_{ac}$ plotted against $NI_{ac}$ with $NI_{dc}$ as a parameter, is generally preferred for circuit applications because load lines can be constructed on it in the manner of load lines on vacuum tube characteristics. Fig. 6 shows $NI_{ac}$ plotted against $NI_{dc}$ with $B_{ac}$ as the parameter.

Figure 7:
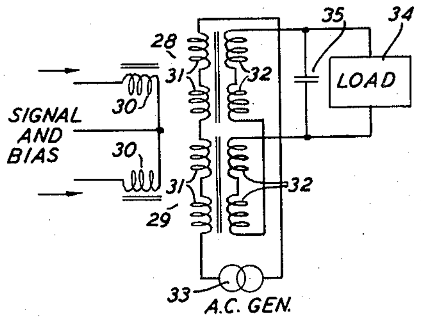
Fig. 7 illustrates a typical magnetic amplifier of the type known in the prior art.

A typical magnetic amplifier circuit of the type known in the art is illustrated in Fig. 7. This amplifier consists of two saturable reactors or transformers 28 and 29 which are similar to the reactor described in connection with Fig. 1 except that each has two A.-C. windings on each outer leg. Each reactor has a control winding 30, a pair of power windings 31, and a pair of output windings 32. Both the power windings 31 and the output windings 32 correspond to the A.-C. windings 23 and 24 in Fig. 1, while the control windings 30 correspond to the D.-C. winding 25.

The control windings 30 of the respective reactors in Fig. 7 are connected in push-pull relation and are operated with equal D.-C. currents at balance to provide a form of bias magnetization. They may be supplied with signal currents, for example, from a push-pull vacuum tube amplifier (not shown). The power windings 31 of the two saturable reactors are connected in series aiding relation across a suitable A.-C. power source 33, while the output windings 32 are connected in series opposition relation across the amplifier load 34. In other words, when the voltages across the power windings of the two saturable reactors are equal, no net voltage appears across the output windings. Thus, when the voltages appearing across control windings 30 are equal, no voltage appears across the load. In each saturable reactor, the respective A.-C. windings are coupled so that the A.-C. voltage appearing across the power circuit windings 31 is related to the voltage appearing across the output circuit windings 32 by the ratio of transformation between the power and output windings.

To introduce a signal to the magnetic amplifier illustrated in Fig. 7, the control current in one saturable reactor control winding 30 is increased at the same time the control current at the other is decreased. This causes the power voltage to become unequally divided between the reactors and allows a voltage to appear across the load 34. The phase or sense of this output voltage depends upon which control current increases and which decreases.

In the past, it has often been the practice to connect a capacitor 35 across the output windings 32 in shunt with the load 34 to increase the gain and the output voltage of the amplifier. The impedances of the magnetic amplifier windings are inductive and the capacitor tunes the circuit to partial resonance, thereby increasing the voltage appearing across output windings 32 and load 34. In addition, past practice has often been to use the capacitor to filter harmonic components out of the output voltage.

Figure 8:
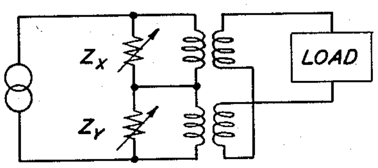
Figs. 8 through 11 represent curves and equivalent circuits useful in the explanation of the operation of the magnetic amplifier shown in Fig. 7.
Figure 9:
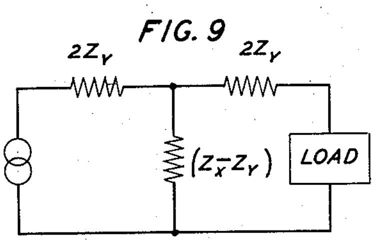

Equivalent circuits of the magnetic amplifier illustrated in Fig. 7 are shown in Figs. 8 and 9 and are useful in demonstrating its steady-state operation. They both treat a saturable reactor as consisting of two basic parts, a variable shunt impedance and an ideal transformer. The circuit in Fig. 9 further treats the ratio of transformation as 1:1 and $Z_x$ as greater than $Z_y$. The values of $Z_x$ and $Z_y$ may be determined from a saturable reactor characteristic curve similar to that in Fig. 5. This curve is shown in Fig. 10.

Figure 10:
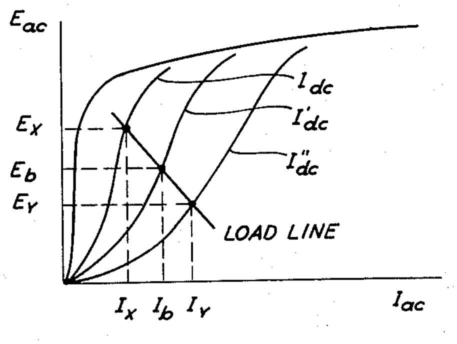

In Fig. 10, $E_b$ and $I_b$ represent the A.-C. voltage and current, respectively, of a saturable reactor and define the conditions of both reactors in Fig. 7 at balance. Hence, $$Z_x=Z_y=\frac{E_b}{I_b}$$

at balance. However, at some given unbalance the direct current control currents are changed so that $$Z_x=\frac{E_x}{I_x}$$

and $$Z_y=\frac{E_y}{I_y}$$

The voltage appearing across the load with a 1:1 transformer is the vector difference of $E_x$ and $E_y$, and the load current is half the vector difference of $I_x$ and $I_y$.

From the above considerations and since $Z_x$ and $Z_y$ are primarily inductive reactances, the connection of a capacitance across the load will cause a higher output voltage for a given direct current unbalance. In other words, the addition of this capacitance increases the gain of the amplifier.

Since the saturable reactors 28 and 29 are not linear circuit elements, there is, however, a maximum value of capacitance that may be added if ferroresonance involving the saturable reactors 28 and 29 and the capacitor 35 and associated circuit instability are to be avoided. This usually limits the practical increase in output voltage at somewhat less than the value that might be expected from using linear circuit theory and the equivalent circuits.

It is of particular interest to note that the "amplifier" shown in Fig. 7 is more than merely an amplifier. As a practical matter, the signal introduced in the control windings 30 may have any frequency from zero up to about half the power frequency. The output when the signal is at D.-C. or zero frequency is at the power frequency. At other signal frequencies, the output is composed of modulation products of the power frequency and the signal frequency. The circuit, therefore, is actually a balanced modulator which suppresses the carrier and allows certain modulation products to flow, the most important of which are $(f_p+f_s)$ and $(f_p-f_s)$, where $f_p$ and $f_s$ are the carrier or power frequency and the signal frequency respectively. Some magnetic amplifiers employ rectifier type demodulators to restore the output to signal frequency. If the circuit is used primarily for supplying power to induction motor windings, however, the motor itself serves as the demodulator.

One of the characteristics of a magnetic amplifier which is of primary importance is its bandwidth. In dealing with magnetic amplifiers that are intended for servo-system applications where feedback loops are involved, it is customary to specify bandwidth by the frequency at which a 45-degree signal or envelope phase shift is obtained. This is sometimes referred to as the "corner frequency." In the case of a simple circuit involving only a resistance R and an industance L, this frequency would be the frequency at which the resistance equals the inductive reactance and the current is 0.707 times the value of the current at zero frequency. This is related to the classical time constant for such a circuit as follows:

$$\text{Time constant } T=\frac{L}{R}$$

$$\text{Corner frequency } \omega_0=\frac{1}{T} \text{ in radians per seconds}$$

In circuits involving more reactive elements, the definition of T is not as significant but the definition of 45 degrees phase shift of the signal frequency is equally applicable to system stability considerations.

The factors involved in predicting the bandwidth of this type of circuit involve all three of the terminating circuits, i. e., those for the control and power windings as well as that of the output windings. Most of the phase shift which serves to limit bandwidth is introduced by the control circuit self-inductance. This inductance depends on the magnetization of the reactor cores, which is a function of control winding current, applied A.-C. voltage, and output circuit termination.

Figure 11:
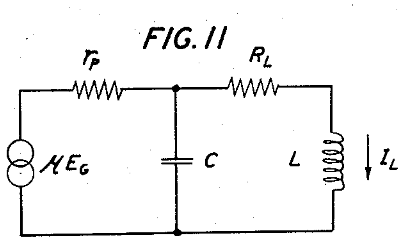

The equivalent circuit of the control circuit used in the magnetic amplifier of Fig. 7 is shown in Fig. 11. The signal voltage is $E_g$, the amplified grid voltage of the driver amplifier tube (not shown). The dynamic plate resistance of the tube $r_p$ is the forcing resistor, a second harmonic limiting capacitor (not shown in Fig. 7) connected across the control windings 30 is C, and L is the self-inductance of the control winding. $R_L$ is the effective resistance of the control winding. In this amplifier, if the bandwidth is not investigated above approximately 1/100 of the power frequency, a straightforward calculation of the amplitude and phase shift of the output voltage based on the current $I_L$ is reasonably accurate. However, since frequencies of an order of magnitude greater than that are of interest, other factors must be considered.

The output circuit, if it involves reactive elements, is likely to treat the two sidebands produced by the magnetic amplifier differently. If one or the other of the sidebands is amplified or attenuated due to the nature of the circuit, a change in the phase shift and amplitude of the envelope or signal frequency results. This must be taken into account when a shunt capacitor is connected across the load.

Figure 12:
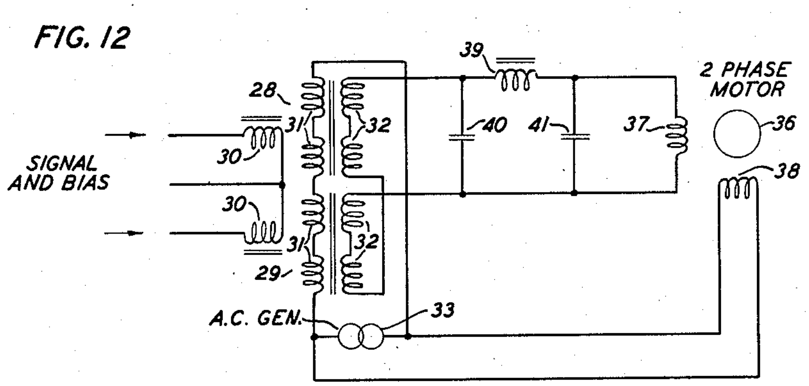
Fig. 12 illustrates a magnetic amplifier embodying the present invention.

A magnetic amplifier embodying the present invention is illustrated in Fig. 12. The basic amplifier is similar to the prior art magnetic amplifier shown in Fig. 7 in that it has two substantially identical saturable reactors 28 and 29 each of which has a control winding 30, a pair of power windings 31, and a pair of output windings 32. In each reactor, the power and output windings are closely coupled with respect to each other and conjugate (i. e., not coupled with regard to the power frequency at steady state) with respect to the control windings. The power windings 31 are connected in series aiding relation across the A. C. power supply 33, and the output windings 32 are connected in series opposition across a suitable output circuit. Both bias and signal currents are introduced in the control windings 30 (e. g., from a suitable push-pull vacuum tube amplifier). With no signal, the currents in the two control windings 30 are equal. Signal is introduced by increasing one control winding current and decreasing the other simultaneously and may be expressed as the algebraic difference of the control currents. Signal applied in this manner causes a power frequency voltage which is substantially proportional to the difference between the control currents to appear across the output windings 32. The phase of this power frequency voltage is reversed if the algebraic sign of the difference of the control currents is reversed.

The magnetic amplifier shown in Fig. 12 is depicted as controlling a two-phase induction motor 36 which may be, for example, part of a servo-control system. Motor 36 has two field windings 37 and 38. The first 37 is the so-called control phase and the second 38 is the so-called fixed or reference phase. Fixed phase 38 is connected directly across the same A. C. source 33 that supplies power to the power windings 31 of the magnetic amplifier. The control phase 37, on the other hand, is coupled across the amplifier output windings 32 by way of a network which will be described.

In accordance with the present invention, a four-terminal $\pi$ network comprising a series inductor 39 and a pair of shunt capacitors 40 and 41 is connected in series between the amplifier output windings 32 and the control phase 37 of motor 36. Inductor 39 is generally a linear inductor but may be used with a shaped inductance characteristic to provide limiting or other control of the amplifier output voltage. In general, the numerical values of the reactances presented by inductor 39 and capacitors 40 and 41 at the power frequency are substantially the same.

In the prior art magnetic amplifier illustrated in Fig. 7, a single capacitor 35 is connected across the output windings to improve the gain and increase the output voltage of the device. The impedances of the reactor windings are inductive and the capacitor tunes the circuit to partial resonance, thereby increasing the voltage appearing across the amplifier output windings and the load. As has already been pointed out, however, such a capacitor is limited to a maximum value above which the magnetic amplifier would be unstable to the presence of low frequency oscillations caused by a ferroresonant condition of the saturable reactors 28 and 29 in combination with the capacitor. This maximum capacitance is below the value which would tune the circuit to resonance, thereby limiting the effect that such a condenser can have in increasing the amplifier gain and power output.

The present invention permits greater output voltage and gain to be realized without danger of instability. The capacitance of capacitor 41 may be chosen so that the parallel combination of capacitor 41 and motor winding 37 will be capacitive and will have a value of impedance such that the voltage across the motor winding is greater than the voltage across capacitor 40. This results from a partial resonance between inductor 39 and the parallel combination of capacitor 41 and motor winding 37. The net result is that a higher gain consistent with magnetic amplifier stability (i. e., freedom from ferroresonance) is made possible by the present invention that was available heretofore with a single shunt capacitor element.

In addition to improving magnetic amplifier gain, the present invention makes possible an output voltage wave shape that is very nearly sinusoidal down to very small signals. The combination of internal impedance of the saturable reactors 28 and 29, inductor 39, capacitor 40, and capacitor 41 forms a two-section, low-pass filter. This filter is arranged to cut off just below the second harmonic of the power frequency. This improves the output wave shape while having a minimum effect on the upper sideband voltage. The attenuation of either sideband by this circuit is sufficiently low within the range of signal frequencies employed to have very little effect on the bandwidth of the magnetic amplifier. The prior art arrangement of a single capacitor is likely to have enough effect on upper sideband transmission to cause a greater signal frequency phase shift.

The harmonic elimination feature of the invention may be supplemented, if desired, by the prior art arrangement consisting of one or more shorted windings placed both under and over the amplifier control windings. In such an arrangement a shorted turn of copper sheel slightly wider than the control winding may be wound under the control winding of each reactor and a similar shorted turn may be wound over each such control winding. The shorted turns are insulated from the respective control windings and form a low impedance path for the flow of second harmonic current, thus substantially eliminating second harmonic components from the output voltage. In addition, electrostatic shielding is provided for the control windings and the control windings are made self-protecting with regard to voltage breakdowns.

A major advantage of the present invention is that it may be arranged to provide a 90-degree phase shift between the A. C. power voltage and that applied to the control phase 37 of the servo motor 36. Since, in such an arrangement, it is in quadrature with the load voltage, the power voltage source 33 can then be used to supply power to the fixed or reference phase 38 of the motor without the use of any extra phase-shifting circuits. In the prior art devices like that illustrated in Fig. 7, the fixed phase of a servo motor driven by the magnetic amplifier has either to be supplied from a separate A. C. power source or, if supplied from the same source as the magnetic amplifier, to be supplied through auxiliary phase-shifting circuits.

The four-terminal $\pi$ network featured by the invention also reduces previously existing limitations on the signal frequency response or bandwidth of magnetic amplifiers. To make the output of the prior art magnetic amplifier shown in Fig. 7 a maximum, it is necessary to approach as closely as possible to resonance at the power frequency between the internal impedance of the saturable reactors and the capacitor 35. This means that the output voltage is peaked sharply at or near the power frequency. Since the ouput of the magnetic amplifier is an envelope modulation (double-sideband carrier-suppressed), this means that the output drops sharply as the signal frequency is increased. The four-terminal $\pi$ network featured by the present invention does not exhibit this undesirable characteristic since it behaves as a low-pass filter with a cut-off frequency well above the highest expected frequency of the upper sideband. The signal frequency response of the amplifier is thereby extended, the primary remaining limitation being the inductance of the control winding.

Figure 13:
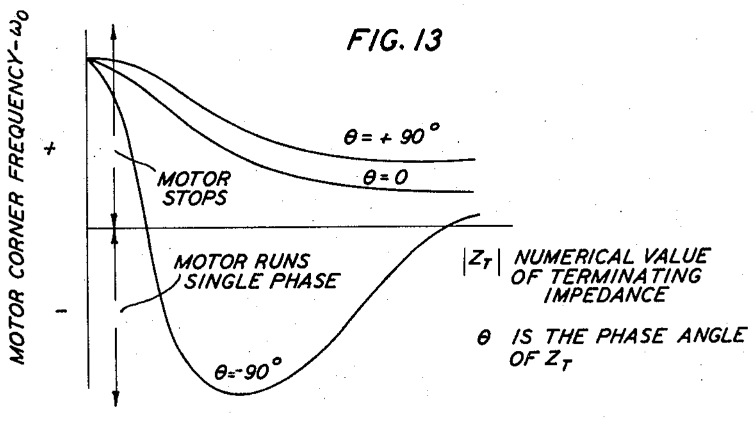
Figs. 13 and 14 represent curves useful in the explanation of several aspects of the invention.

As has already been pointed out, another disadvantage involved in the use of a single capacitor connected across the output windings of a magnetic amplifier to increase the gain is encountered when the amplifier is used to control a two-phase induction motor in a servo-control system. This disadvantage of the prior art may best be explained by considering the nature of the amplifier load under such conditions. The load is one winding of an induction motor and is not a passive load when the motor is rotating, since a "generated" voltage appears across this winding proportional to the speed of the motor. If such a motor has one phase only energized and the other terminated in a suitable passive impedance, the motor will run single-phase. This characteristic for a typical motor is shown in Fig. 13, where motor corner frequency $\omega_0$ is plotted against the absolute value of the terminating impedance $Z_T$ for several values terminating impedance phase angle $\theta$. In Fig. 13, negative values of the motor corner frequency $\omega_0$ indicate that with the fixed or reference phase properly excited, the motor will develop torque and continue to run, once shaft rotation has started, without energy being supplied to the control phase winding from any external source. On the other hand, positive values of the motor corner frequency $\omega_0$ indicate that the motor will not continue to run after an initial shaft rotation unless current in the proper phase is supplied externally to the control phase winding. From this, it is evident that with certain capacitive impedances terminating one phase, this typical motor will run with power supplied to only one phase. Such a terminating impedance must be avoided or the single-phase operation of the motor will cause the magnetic amplifier to lose control of the speed and direction of rotation of the motor. This condition is difficult to avoid when the prior art circuit in Fig. 7 is used with a capacitor 35 across the load, since the value of capacitance needed to achieve the desired gain usually satisfies the criterion for motor instability.

Figure 14:
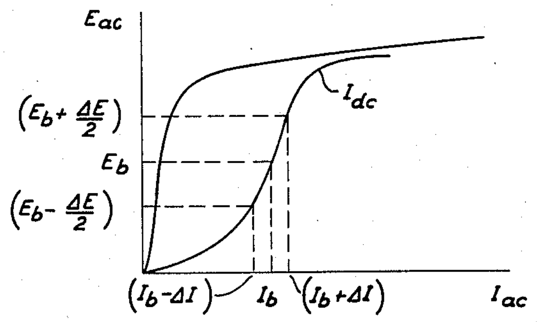

The effect of this generated voltage on the magnetic amplifier is shown in Fig. 14, where $E_{ac}$ is plotted against $I_{ac}$ with $I_{dc}$ as a parameter. Referring to the equivalent circuit of Fig. 8, it is assumed that a voltage E in phase with the generator voltage is applied across the load when the circuit is balanced (i. e., $Z_x=Z_y$). This voltage causes a current to flow in the output winding which aids the exciting current in $Z_x$ and opposes it in $Z_y$. This unbalances the magnetic amplifier until the voltage delivered by the unbalanced amplifier equals the new voltage E. Since the control circuit conditions of balance are not changed, this causes the saturable reactor elements to establish new operating points, as shown in Fig. 14. The impedance presented to the voltage E is relatively high, being $$\frac{\Delta E}{\Delta I}$$

This value is several times the value of the Thevenin equivalent impedance $$2Z_y=\frac{2E_b}{I_b}$$

at balance. Since this value of impedance is high, the margin of stability for the motor is not large in any event. With a capacitor in shunt with the motor, the impedance presented to the motor is nearly that of the capacitor, and the motor tends to run single phase.

The four-terminal network featured by the present invention functions in the following way to make the motor stable. As previously stated, the numerical values of the three reactances are about the same at the power frequency. Capacitor 40 is shunted by the internal impedance of the saturable reactors 28 and 29. Hence, the combination of capacitor 40, inductor 39, and the reactors 28 and 29 presents a low value of capacitive reactance to the motor. This capacitive reactance is shunted by capacitor 41 so that a very low terminating impedance is presented to the motor, placing it in the stable range even though the termination is capacitive. In magnetic amplifier motor-control arrangements embodying the invention, the motor does not provide a generated voltage in excess of the unbalance caused by the control windings of the amplifier, and very satisfactory damping is obtained.

With regard to motor damping and stability, previous practice in servo systems employing the prior art magnetic amplifier circuit of Fig. 7 has been to use tachometer feedback to provide the motor with a positive corner frequency $\omega_0$ of adequate value to insure stability and desired servo-system performance. The use of two additional passive elements in accordance with the principles of the present invention eliminates any necessity for the extra feedback loop and also eliminates several circuit elements, including at least one with moving parts.

Finally, it should be noted that in magnetic amplifiers embodying the present invention, circuit performance does not depend upon critical tuning or adjustment of the circuit elements between the output windings and the load. It is common to operate the prior art circuit of Fig. 7 with the capacitor 35 across the load tuned just as close to resonance as may be tolerated without instability. In the embodiment of the invention illustrated in Fig. 12, none of the circuits need be operated near resonance, and the variations in the values of inductor 39 and capacitors 40 and 41 that can be tolerated are much greater.

It is to be understood that the arrangement which has been described is illustrative of the application of the principles of the invention. Numerous other arrangements may be devised by those skilled in the art without departing from the spirit and scope of the invention.

What is claimed is:

1. A magnetic amplifier circuit which comprises at least one saturable reactor having control, power, and output windings, circuit means to supply slowly varying direct control currents to said control winding, circuit means to supply alternating current to said power winding, a $\pi$ network in the form of a pair of shunt capacitive reactances and an interposed series inductive reactance connected with a first of said capacitive reactances across said output winding, an inductive load, and circuit means to couple said load across the second of said capacitive reactances, said second capacitive reactance being less than the inductive reactance of said load at the frequency of said alternating current and said series inductive reactance being at least partially resonant at the frequency of said alternating current with the reactance of the parallel combination of said second capacitive reactance and said load.

2. A magnetic amplifier circuit which comprises at least one saturable reactor having control, power, and output windings, circuit means to supply signal currents to said control winding, circuit means to supply an alternating carrier voltage to said power winding, an inductive load, and circuit means to couple said load to said output winding, said last-mentioned circuit means including a $\pi$ network having a pair of shunt capacitors and an interposed series inductor connected in series between said output winding and said load to increase the gain of the amplifier without creating any degree of instability due to low frequency oscillations, the capacitive reactance of the said shunt capacitor remote from said output winding being less than the inductive reactance of said load at the carrier frequency and the inductive reactance of said series inductor being substantially equal to the capacitive reactance of each of said shunt capacitors at the carrier frequency.

3. A magnetic amplifier circuit which comprises at least one saturable reactor having control, power, and output windings, circuit means to supply slowly varying direct control currents to said control winding, circuit means to supply alternating current to said power winding, a two-phase induction motor having a reference phase and a control phase, and circuit means to couple the control phase of said motor to said output winding, said last-mentioned circuit means including a $\pi$ network having a pair of shunt capacitors and an interposed series inductor connected in series between said output winding and the control phase of said motor to increase the gain of the amplifier without causing the amplifier to lose control of said motor and said motor to operate single-phase, the capacitive reactance of the said shunt capacitor remote from said output winding being less than the inductive reactance of the control phase of said motor at the frequency of said alternating current and said series inductor being at least partially resonant at the frequency of said alternating current with the reactance of the parallel combination of the control phase of said motor and the said shunt capacitor remote from said output winding.

4. A magnetic amplifier circuit which comprises a pair of saturable reactors each having control, power, and output windings, circuit means to supply slowly varying direct control currents to the respective control windings of said reactors in push-pull relation, circuit means to connect the respective power windings of said reactors in series aiding relation, circuit means to supply alternating current to said power windings, circuit means to connect the respective output windings of said reactors in series opposition, a $\pi$ network in the form of a pair of shunt capacitive reactances and an interposed series inductive reactance connected with a first of said capacitive reactances across said output windings, an inductive load, and circuit means to couple said load across the second of said capacitive reactances, said second capacitive reactance being less than the inductive reactance of said load at the frequency of said alternating current and said series inductive reactance being at least partially resonant at the frequency of said alternating current with the reactance of the parallel combination of said second capacitive reactance and said load.

5. A magnetic amplifier circuit which comprises a pair of saturable reactors each having control, power, and output windings, circuit means to supply signal currents to the respective control windings of said reactors in push-pull relation, circuit means to connect the respective power windings of said reactors in series aiding relation, circuit means to supply an alternating carrier voltage to said power windings, circuit means to connect the respective output windings of said reactors in series opposition, an inductive load, and circuit means to couple said load to said output windings, said last-mentioned circuit means including a $\pi$ network having a pair of shunt capacitors and an interposed series inductor connected in series between said output windings and said load to increase the gain of the amplifier without creating any danger of instability due to low frequency oscillations, the capacitive reactance of the said shunt capacitor remote from said output windings being less than the inductive reactance of said load at the carrier frequency and the inductive reactance of said series inductor being substantially equal to the capacitive reactance of each of said shunt capacitors at the carrier frequency.

6. A magnetic amplifier circuit which comprises a pair of saturable reactors each having control, power, and output windings, circuit means to supply slowly varying direct control currents to the respective control windings of said reactors in push-pull relation, circuit means to connect the respective power windings of said reactors in series aiding relation, circuit means to supply alternating current to said power windings, circuit means to connect the respective output windings of said reactors in series opposition, a two-phase induction motor having a reference phase and a control phase, and circuit means to couple the control phase of said motor to said output windings, said last-mentioned circuit means including a $\pi$ network having a pair of shunt capacitors and an interposed series inductor connected in series between said output windings and the control phase of said motor to increase the gain of the amplifier without causing the amplifier to lose control of said motor and said motor to operate single-phase, the capacitive reactance of the said shunt capacitor remote from said output windings being less than the inductive reactance of the control phase of said motor at the frequency of said alternating current and said series inductor being at least partially resonant at the frequency of said alternating current with the reactance of the parallel combination of the control phase of said motor and the said shunt capacitor remote from said output windings.

References Cited in the file of this patent

UNITED STATES PATENTS

| | | |
|---|---|---|
| 1,847,079 | Burton | Mar. 1, 1932 |
| 2,092,891 | Overbeck | Sept. 14, 1937 |
| 2,139,232 | Hysko | Dec. 6, 1938 |
| 2,546,271 | McKenney et al. | Mar. 27, 1951 |